Figure 1:
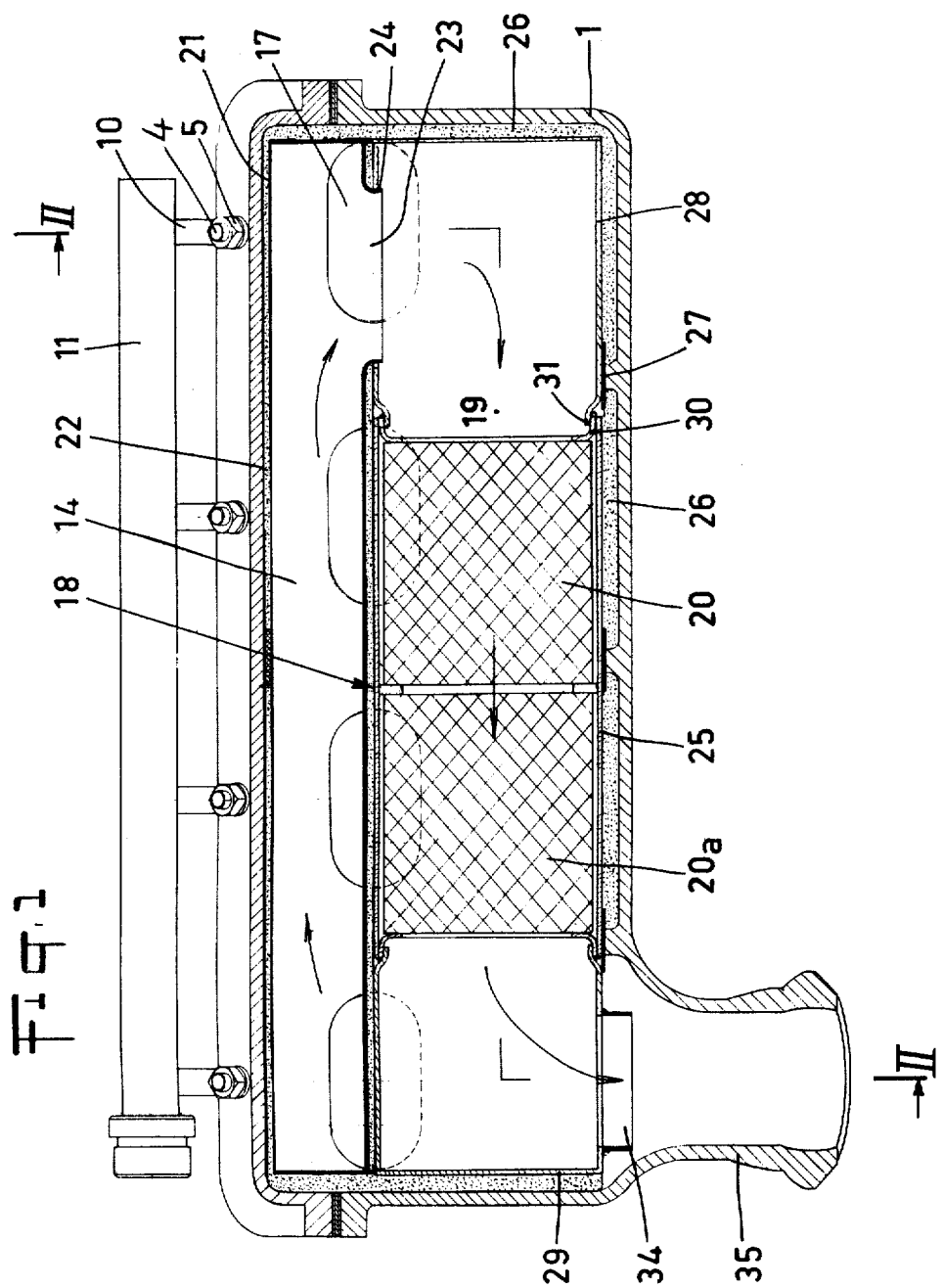

United States Patent [19]
Hergoualch

[11] 3,935,705
[45] Feb. 3, 1976

[54] EXHAUST MANIFOLD FOR AN INTERNAL COMBUSTION ENGINE

[75] Inventor: Jean René Hergoualch, Bougival, France

[73] Assignees: Regie Nationale des Usines Renault, Billancourt; Automobiles Peugeot, Paris, both of France

[22] Filed: Sept. 21, 1973

[21] Appl. No.: 399,417

[30] Foreign Application Priority Data
Mar. 10, 1972 France .............................. 7235012

[52] U.S. Cl................... 60/302; 23/288 F; 60/282; 60/305
[51] Int. Cl.²......................................... F01N 3/14
[58] Field of Search...................... 60/282, 302, 305; 23/288 F

[56] References Cited
UNITED STATES PATENTS

| | | | |
|---|---|---|---|
| 1,793,813 | 2/1931 | MacKinnon | 60/302 |
| 3,247,666 | 4/1966 | Behrens | 60/302 |
| 3,302,394 | 2/1967 | Pahnke | 60/302 |
| 3,413,803 | 12/1968 | Rosenlund | 60/274 |
| 3,441,382 | 4/1969 | Keith | 60/302 |
| 3,644,098 | 2/1972 | Palma | 60/302 |
| 3,775,979 | 12/1973 | Scheitlin | 60/282 |
| 3,799,196 | 3/1974 | Scheitlin | 60/322 |
| 3,807,173 | 4/1974 | Zmuda | 60/302 |

FOREIGN PATENTS OR APPLICATIONS
1,043,890  9/1966  United Kingdom................... 60/302

*Primary Examiner*—Douglas Hart
*Attorney, Agent, or Firm*—Stevens, Davis, Miller & Mosher

[57] ABSTRACT

A manifold for an internal combustion engine to serve also as an exhaust gas depollution reactor. An ante-chamber into which the gas initially flows, can be made to operate as a post-combustion chamber by introduction of excess combustion air while the engine is operating under the usual richer fuel/air mixture on start-up. The catalytic reaction components are located in a downstream main chamber with which the ante-chamber shares a common partition wall for heat transfer purposes.

11 Claims, 2 Drawing Figures

EXHAUST MANIFOLD FOR AN INTERNAL COMBUSTION ENGINE

The present invention relates to an exhaust manifold structure for an internal combustion engine, comprising a catalytic reactor for the depollution of the exhaust gases, particularly for the reduction of oxides of nitrogen.

Such reactors must fulfil the opposing operative conditions of (a) rapid rise in temperature since the catalytic reaction only starts above a certain temperature, and (b) maintaining a sufficiently low temperature to prevent the catalyst from being destroyed by overheating.

For this purpose they are generally placed in series on the exhaust pipe, sufficiently far away from the exhaust manifold of the engine to prevent overheating, whilst being as close as possible in order that they achieve operating temperature as soon as possible on start up, and that they maintain this temperature during operation despite the fact that the reduction reaction is endothermic.

Furthermore it is known to provide devices which control the reactor temperature by controlling the amount of additional air supplied to it, for example, in French Pat. application No. 71/46,986 of Dec. 28, 1971, in the names of the applicant companies.

These compromise solutions are either not sufficiently effective like the first mentioned, or more complex like the second mentioned.

The subject of the present invention is an internal combustion engine exhaust manifold structure in which catalytic reduction reaction components have been incorporated despite risks of overheating due to the proximity of the exhaust ports of the engine. The manifold ensures very rapid startup of the reactor and great compactness of the device, the internal arrangement and the structure of the apparatus making it possible, nevertheless, to prevent overheating of the catalytic components as well as making it easier to inspect them and change them.

According to the invention there is provided an exhaust manifold for an internal combustion engine, comprising an ante-chamber and a main chamber having a common partition wall and defining a gas flow path through first the ante-chamber and then the main chamber, means in the main chamber for receiving catalytic reaction components, and means for introducing post combustion air into gas flowing through said ante-chamber.

The ante-chamber forms a starting post-combustion reactor by momentarily inroducing additional air into the gas flow therethrough and the main chamber will contain the catalytic reaction components for reducing the gases brought to the reaction starting temperature by the "start-up" post-combustion in the ante-chamber while the engine fuel/air ratio is temporarily increased on start-up.

The ante-chamber may have a prismatic shape of irregular cross-section into which the main chamber, containing the catalytic reaction components, fits along the lower part of the ante-chamber opposite the inlets to the manifold, and the upper surface of the ante-chamber and the partition wall common to both chambers may comprise a double wall with a low thickness insulation, the inlets opening substantially into the lower part of the ante-chamber tangentially to the surface of the common partition wall.

The main and ante-chamber may be disposed within an outer jacket consisting of two parts: a body which receives inlet tubes and a cover which bears against a joining plane which plane substantially bisects the main and ante-chambers, the chambers forming separate interchangeable blocks which are located inside the outer body and are held in place by closing the cover.

Whilst the ante-chamber consists of an inner steel jacket, made in a single piece, and resistant to corrosion and to the temperature of the exhaust gases, the main chamber may advantageously consist of an inlet casing into a side aperture of which the corresponding outlet of the first chamber fits, and of an outlet casing the side aperture of which opens into the outlet tube of the outer manifold body, these two casings fitting to either side of the catalytic components receiving means to form the body of the main chamber.

The inlet tubes are each lined with a tube made of sheet-steel which is resistant to the temperature and to the corrosive effects of the exhaust gases and is held by a collar gripped by the attachment connection of the outer body to the engine.

This arrangement according to the invention makes it possible to produce a reactor consisting of simple individual components which can be interchanged separately and which are held together by the outer body. The fastening of the reactor to the engine and the means of closing of its cover are readily accessible and removal of the cover allows complete inspection of each component of the reactor. As a result of this simplicity of shape and ease of assembling, the cost is low.

The arrangement according to the invention makes it possible, during engine start-up to introduce excess air via a set of air injection jets, and this ensures that the ante-chamber functions as a post-combustion reactor bringing about a rapid rise in temperature of the catalytic reactor, since the common partition wall between the ante-chamber and the catalytic reactor of the main chamber is played upon directly by the flames coming from the inlet tubes. As soon as the reaction starting temperature is reached and the engine is functioning with a weaker fuel/air mixture after the engine starting-up period, the supply of post-combustion air is discontinued and the catalytic reactor functions as a reducer of the nitrogen oxides.

Thus this initial oxidizing post-combustion makes it possible to remove the excess hydrocarbons and nitrogen oxides due to the richer fuel/air mixture on startup, the nitrogen oxides in any case remaining low at this stage, whilst ensuring that the reducing catalyst is brought rapidly to operating temperature to take over the rapid depollution stage as soon as the nitrogen oxides content increases.

The temperature of the reactor is maintained by the exhaust gases and the regulating effect of the ante-chamber on the temperature of the exhaust gases.

The fact that in the preferred embodiment the inlet tubes enter the ante-chamber tangentially, and the asymmetric shape of the ante-chamber bring about eddies and turbulences and hence effect the uniform mixing of the exhaust gases and heat exchange between the gases and the walls. The low insulation of the upper walls of the ante-chamber and of the common partition wall asists the external removal of heat of the gases when the engine is operating under heavy load. The supply of additional heat to the reactor will compensate for its increase in activity. The degree of insulation of the ante-chamber thus makes it possible to adjust the limiting values of the operating temperature of the catalytic components.

Figure 2:
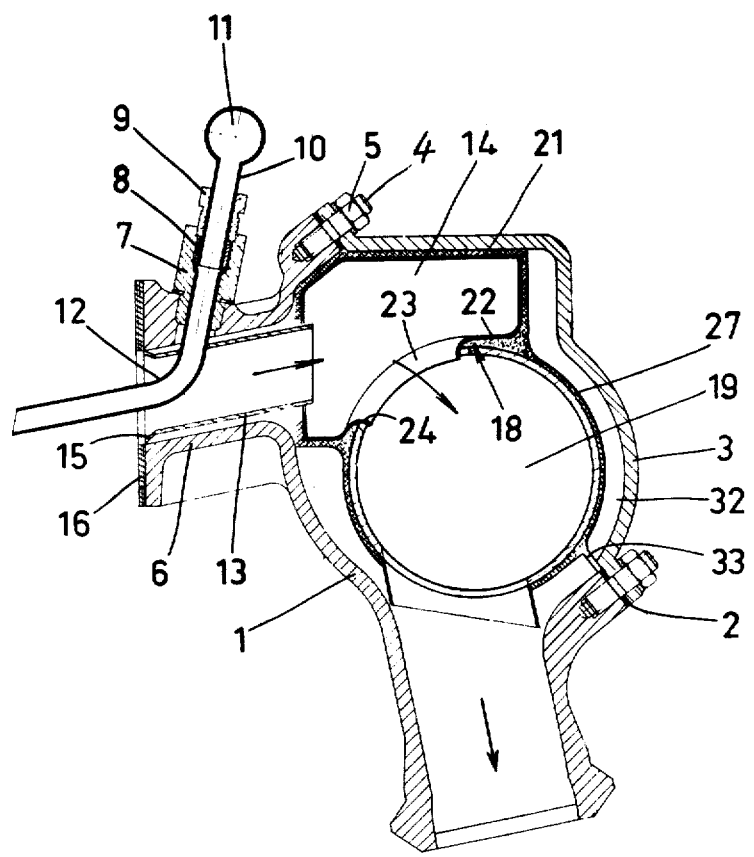

In order that the present invention may more readily be understood the following description is given, merely by way of example, reference being made to the accompanying drawings in which:

FIG. 1 is a longitudinal cross-sectional view of the exhaust manifold according to the invention; and FIG. 2 is a transverse cross-sectional view along line II—II of FIG. 1

FIGS. 1 and 2 represent an embodiment of an exhaust manifold according to the invention, which comprises an outer body 1 having a removable cover 3 securable by means of threaded bolts 4 and nuts 5, with a gasket 2 being interposed (between the outer body 1 and the cover 3), the said body 1 and the cover 3 consisting especially of cast-iron parts.

The body 1 has gas inlet tubes 6 attached to the exhaust ducts of an internal combustion engine. Connecting devices 7 attached to the tubes 6 receive on the one hand, tubes 10 of an air manifold 11 for additional post-combustion air and on the other hand, air tubes 12 opening upstream from the tubes 6. The connections of the tubes 10 and 12 is by way of a biconical sleeve 8 and a threaded socket 9. The manifold inlet tubes 6, which are lined internally with a tube 13 made of stainless refractory sheet-steel, open into an ante-chamber 14.

One of the ends of each inlet tube 13 is free, whilst the other end has a collar 15 gripped in the gasket 16 of the exhaust manifold. The ante-chamber 14, in which post-combustion is initiated has a prismatic shape with a cross-section substantially that of a rectangular parallelepiped, the lower corner of which, opposite the inlet apertures 17 (FIG. 2) from the engine exhaust ducts is truncated by a wall 18 common to a second or main chamber 19 containing cylindrical catalytic components 20 anad 20a (FIG. 1) and whose longitudinal axis is parallel to the longitudinal edges of the ante-chamber.

The ante-chamber 14 consists of a casing 21 made of stainless refractory sheet-steel covered with a layer 22 of a heat and sound insulating material of known type, such as glass wool. Its outer contour fits into the upper part of the body 1 and of the cover 3, as well as onto the cylindrical surface of the main chamber 19 of the catalytic reactor. The ante-chamber 14 opens at one of its ends into the main chamber 19, via an orifice 23 whose fitting-in rim 24 ensures that the orifices common to the main and ante-chambers are centred.

The main chamber 19 forming the catalytic reactor consists of a tubular sheet-steel sleeve 25 which contains the catalytic components 20 and 20a and is covered with a layer 26 of an insulating material and with wire mesh grid 27, damping the vibrations in the components 20 and 20a.

An inlet casing 28, forming a post-combustion chamber portion of the main chamber and an outlet casing 29 are fitted at each end of the sleeve 25, the said sleeve having collars 30 into which the rims 31 of the casings 28 and 29 are fitted.

The cylindrical assembly of the main chamber 19 thus formed is kept centred in the corresponding cylindrical seat of the outer body 1, from which it remains separated by a gas space 32, by its being fitted into the corresponding seat of the jacket 21 of the ante-chamber 14, against which it is held by the rim 33 of its grid 27 gripped in the joint 2.

Due to this arrangement, the main chamber 19 of the catalytic reactor is not subjected directly to the vibrations of the engine transmitted by the outer rigid body 1. The outlet casing 29 of the main chamber 19 has a gas outlet orifice 34 opening into an outlet tube 35 provided in the body 1 and having a conventional bell flange to receive the exhaust front pipe.

Since the contacts between the various components are made by simply fitting them into one another, cushioned by insulating layers therebetween so as to avoid direct contact good sound and vibratory damping are achieved and considerable tolerances are allowed in assembling. Also free play is provided for expansion, limiting the heat deformations of the sheet-steel.

When the internal combustion engine is being started up, excess air is introduced into the inlet tubes 6 via the row of injection jets 11 and air tubes 12, in such a way that the ante-chamber 14 functions as a post-combustion reactor, bringing about a rapid rise in temperature in the main chamber 19 of the catalytic reactor, since the partition 18 common to the main and ante-chambers 19 and 14 is played upon directly by the flames coming from the inlet tubes 6. As soon as the operating temperature of the catalyst is reached and the engine is functioning with a weaker gas mixture after the starting up period, the supply of post-combustion air is stopped and the catalytic reactor functions as a reducer of the nitrogen oxides.

We claim:

1. An exhaust manifold for an internal combustion engine comprising a housing enclosing an elongated space, a tubular member disposed in the housing containing catalytic components and having a heat insulating wall which divides the space into first and second parallel chambers extending longitudinally in the space, the second chamber being the bore of the tube and the first chamber being enclosed by a casing covered with a heat insulating material and having a substantially rectangular parallelepiped shaped cross-section, inlet means for flow of exhaust gas from the engine into the first chamber, means for adding air to the said exhaust gas upstream of the inlet means, an opening in said wall for flow of exhaust gas from the first chamber into one end of the second chamber, and means for flow of exhaust gas from the opposite end of the second chamber to an exhaust system of a vehicle.

2. The exhaust manifold of claim 1 wherein said housing comprises a cast iron body and a cover bolted together to form a joint disposed along a plane which bisects the cross-sections of the two chambers.

3. An exhaust manifold for an internal combustion engine comprising inlet means for exhaust gas form an internal combustion engine, outlet means to an exhaust duct, a main chamber, an ante-chamber, a heat insulating partition wall disposed between and common to said main and ante-chambers, said chambers extending parallel to each other, means defining a gas flow path from the inlet means, through the ante-chamber and then the main chamber and on to the outlet means, said flow path defining means including a transfer opening for gas flow from the ante-chamber into the main chamber at one end of the main chamber, said main chamber having an outlet pipe at its other end, said ante chamber having an irregular prismatic shape having a recessed lower part wherein said main chamber fits along said lower part of the ante-chamber opposite said inlet means, said ante-chamber having an upper surface which, together with said partition wall comprises a double wall with thin intermediate insulation, means in the main chamber for receiving catalytic reaction components disposed between the transfer opening and the outlet pipe, and means for introducing post combustion air into the gas flow path through said ante-chamber.

4. an exhaust manifold for an internal combustion engine comprising inlet means for exhaust gas from an internal combustion engine, outlet means to an exhaust duct, a main chamber and an ante-chamber disposed in an inner jacket, a heat insulating partition wall disposed in the inner jacket between said main and ante-chambers, said chambers extending parallel to each other, an outer jacket surrounding the inner jacket and comprising a body in which said inlet means is attached to the manifold, and a cover which engages the body, said body and cover being arranged to be joined along a plane which substantially bisects the cross-section of both the main and ante-chambers, means defining a gas flow path from the inlet means, through the ante-chamber and then the main chamber and on to the outlet means, said flow path defining means including a transfer opening for gas flow from the ante-chamber into the main chamber at one end of the main chamber, said main chamber having an outlet pipe at its other end, means in the main chamber for receiving catalytic reaction components disposed between the transfer opening and the outlet pipe, and means for introducing post combustion air into the gas flow path through said ante-chamber.

5. An exhaust manifold for an internal combustion engine, comprising inlet means for exhaust gas from an internal combustion engine, outlet means to an exhaust duct, an ante-chamber, a main chamber, a heat insulating partition wall disposed between and common to said main and ante-chambers, means defining a gas flow path from the inlet means, through the ante-chamber and then the main chamber and on to the outlet means, means in the main chamber for receiving catalytic reaction components, and means for introducing post combustion air into the gas flow path through said ante-chamber, said inlet means comprising tubes which open substantially into the lower part of the ante-chamber tangentially to the surface of the said partition wall.

6. An exhaust manifold for an internal combustion engine, comprising inlet means for exhaust gas from an internal chamber, a main chamber, a heat insulating partition wall disposed between and common to said main and ante-chambers, means defining a gas flow path from the inlet means, through the ante-chamber and then the main chamber and on to the outlet means, a central sleeve in the main chamber for receiving catalytic reaction components, and means for introducing post combustion air into the gas flow path through said ante-chamber, said main chamber comprising inlet and outlet casings engaged with the ends of said sleeve, and outlet means being in communication with said outlet casing.

7. An exhaust manifold as set forth in claim 3, wherein the main chamber has a cylindrical shape and the ante-chamber has substantially a rectangular parallelepipedonal shape.

8. An exhaust manifold as set forth in claim 4, wherein the inlet means, are formed on a side wall of the outer jacket and the insulating material of the inner jacket portion defining the ante-chamber rests directly on the inner face of said side wall and on the adjacent upper face of said cover, the said inner jacket having a face opposite said side wall, said opposite face forming the common partition wall and receiving the corresponding outer surface of the inner chamber.

9. An exhaust manifold as set forth in claim 4, wherein the main and ante-chambers comprise separate inter-changeable blocks which are located inside the outer jacket and are held in place by said cover when it is closed.

10. An exhaust manifold as set forth in claim 6, wherein said outer jacket comprises a body and a cover releasably securable thereto, and wherein said central sleeve is covered with a layer of insulating material and with a mesh grid, said grid having end edges which are gripped between the outer body and the cover.

11. An exhaust manifold as set forth in claim 10, wherein the end orifices of the said central sleeve have collars and said inlet and outlet casings each have a rim which fits into a respective one of said collars.

* * * * *

UNITED STATES PATENT AND TRADEMARK OFFICE
CERTIFICATE OF CORRECTION

PATENT NO. : 3,935,705
DATED : February 3, 1976
INVENTOR(S) : JEAN RENE HERGOUALCH It is certified that error appears in the above-identified patent and that said Letters Patent are hereby corrected as shown below:

[30] Foreign Application Priority Data
October 3, 1972 France .......... 7235012

Signed and Sealed this fourth Day of May 1976

[SEAL]

Attest:

RUTH C. MASON
*Attesting Officer*

C. MARSHALL DANN
*Commissioner of Patents and Trademarks*